US010169390B2

(12) United States Patent
Luo et al.

(10) Patent No.: US 10,169,390 B2
(45) Date of Patent: Jan. 1, 2019

(54) RANKING SOCIAL NETWORK OBJECTS

(71) Applicant: Google Inc., Mountain View, CA (US)

(72) Inventors: Qingshan Luo, Beijing (CN); Hang Cui, Tianjin (CN); Bo Zhang, Jilin (CN); Dong Zhang, Beijing (CN)

(73) Assignee: Google LLC, Mountain View, CA (US)

( * ) Notice: Subject to any disclaimer, the term of this patent is extended or adjusted under 35 U.S.C. 154(b) by 418 days.

(21) Appl. No.: 14/724,017

(22) Filed: May 28, 2015

(65) Prior Publication Data
US 2015/0339335 A1 Nov. 26, 2015

Related U.S. Application Data

(63) Continuation of application No. 14/049,561, filed on Oct. 9, 2013, now Pat. No. 9,081,823, which is a
(Continued)

(51) Int. Cl.
G06F 7/00 (2006.01)
G06F 17/30 (2006.01)
G06Q 10/10 (2012.01)
(52) U.S. Cl.
CPC .... *G06F 17/30345* (2013.01); *G06F 17/3053* (2013.01); *G06F 17/30342* (2013.01); *G06F 17/30876* (2013.01); *G06Q 10/10* (2013.01)
(58) Field of Classification Search
CPC ......... G06F 17/30345; G06F 17/30876; G06F 17/30342
(Continued)

(56) References Cited

U.S. PATENT DOCUMENTS 5,796,393 A 8/1998 MacNaughton et al.
6,130,938 A 10/2000 Erb
(Continued)

FOREIGN PATENT DOCUMENTS

CN 1684422 10/2005
CN 1806233 7/2006
(Continued)

OTHER PUBLICATIONS

"Yahoo! Group", Feb. 10-22, 2005).*
(Continued)

*Primary Examiner* — Binh V Ho
(74) *Attorney, Agent, or Firm* — Patent Law Works LLP

(57) ABSTRACT

An online social networking system can be used to rank social network objects of various different object types, each according to its type. The objects may comprise types such as users, communities, blogs, blog entries, events, forums, forum topics, postings, photographs, and/or images. The product comprises code for carrying out a method that begins with receiving ranking data about social network objects that comprises data about events performed on the social network. For each social network object, a ranking function is applied to ranking data about the social network object based on its type. In addition, the recency of an event on the social network related to the social network object is evaluated, in order to calculate the score for the social network object. A relative ranking for each of the plurality of social network objects based on its score is determined, and the score and relative ranking of each of the social network objects stored.

18 Claims, 4 Drawing Sheets

Related U.S. Application Data continuation of application No. 12/673,764, filed as application No. PCT/CN2007/002488 on Aug. 17, 2007, now Pat. No. 8,572,094.

(58) Field of Classification Search
USPC .......................................................... 707/748
See application file for complete search history.

(56) References Cited

U.S. PATENT DOCUMENTS

| | | |
|---|---|---|
| 6,192,119 B1 | 2/2001 | Wilson |
| 6,285,999 B1 | 9/2001 | Page |
| 6,697,478 B1 | 2/2004 | Meldrum et al. |
| 6,754,322 B1 | 6/2004 | Bushnell |
| 6,757,682 B1 | 6/2004 | Naimark et al. |
| 6,799,176 B1 | 9/2004 | Page |
| 7,106,848 B1 | 9/2006 | Barlow et al. |
| 7,185,065 B1 | 2/2007 | Holtzman et al. |
| 7,185,236 B1 | 2/2007 | Moser et al. |
| 7,366,990 B2 | 4/2008 | Pitroda |
| 7,509,382 B1 | 3/2009 | Jania et al. |
| 7,555,110 B2 | 6/2009 | Dolan et al. |
| 7,610,287 B1 | 10/2009 | Dean et al. |
| 7,742,468 B2 | 6/2010 | Vagelos |
| 7,761,399 B2 | 7/2010 | Evans |
| 7,769,740 B2 | 8/2010 | Martinez et al. |
| 2002/0137490 A1 | 9/2002 | Gallant |
| 2002/0143874 A1 | 10/2002 | Marquette et al. |
| 2003/0014482 A1 | 1/2003 | Toyota et al. |
| 2003/0028595 A1 | 2/2003 | Vogt et al. |
| 2004/0148275 A1 | 7/2004 | Achlioptas |
| 2004/0258220 A1 | 12/2004 | Levine et al. |
| 2005/0071741 A1 | 3/2005 | Acharya et al. |
| 2005/0138121 A1 | 6/2005 | Banatwala et al. |
| 2005/0152521 A1 | 7/2005 | Liljestrand |
| 2005/0159970 A1 | 7/2005 | Buyukkokten et al. |
| 2005/0234904 A1 | 10/2005 | Brill et al. |
| 2005/0246325 A1 | 11/2005 | Pettinati et al. |
| 2005/0259606 A1 | 11/2005 | Shutter et al. |
| 2006/0026288 A1 | 2/2006 | Acharya et al. |
| 2006/0036591 A1 | 2/2006 | Gerasoulis et al. |
| 2006/0064237 A1 | 3/2006 | Mbekeani et al. |
| 2006/0077957 A1 | 4/2006 | Reddy et al. |
| 2006/0206604 A1 | 9/2006 | O'Neil et al. |
| 2006/0224624 A1 | 10/2006 | Korn et al. |
| 2006/0235933 A1 | 10/2006 | Baluja et al. |
| 2006/0240856 A1 | 10/2006 | Counts et al. |
| 2006/0271859 A1 | 11/2006 | Gorzela |
| 2006/0282304 A1 | 12/2006 | Bedard et al. |
| 2006/0287985 A1 | 12/2006 | Castro et al. |
| 2006/0288073 A1* | 12/2006 | Bansod ................. H04L 63/061 709/204 |
| 2007/0061297 A1 | 3/2007 | Bihun et al. |
| 2007/0083560 A1 | 4/2007 | Choi et al. |
| 2007/0127631 A1 | 6/2007 | Difiglia |
| 2007/0162570 A1 | 7/2007 | Mathur et al. |
| 2007/0171898 A1 | 7/2007 | Salva |
| 2007/0173236 A1 | 7/2007 | Vishwanathan et al. |
| 2007/0179977 A1 | 8/2007 | Reed et al. |
| 2007/0198510 A1 | 8/2007 | Ebanks |
| 2007/0233736 A1* | 10/2007 | Xiong ..................... G06Q 30/02 |
| 2007/0248077 A1 | 10/2007 | Mahle, Jr. et al. |
| 2007/0288563 A1* | 12/2007 | Karkanias ......... G06F 17/30873 709/204 |
| 2007/0288602 A1 | 12/2007 | Sundaresan |
| 2007/0294289 A1 | 12/2007 | Farrell |
| 2008/0004970 A1 | 1/2008 | Ehrensberger et al. |
| 2008/0056475 A1 | 3/2008 | Brannick et al. |
| 2008/0104172 A1 | 5/2008 | Craig |
| 2008/0109252 A1 | 5/2008 | LaFountain et al. |
| 2008/0120166 A1 | 5/2008 | Fernandez et al. |
| 2008/0162510 A1 | 7/2008 | Baio et al. |
| 2008/0189122 A1 | 8/2008 | Coletrane et al. |
| 2008/0192656 A1 | 8/2008 | Vagelos |
| 2008/0235078 A1 | 9/2008 | Hong et al. |

FOREIGN PATENT DOCUMENTS

| | | |
|---|---|---|
| CN | 1937518 | 3/2007 |
| CN | 1945564 | 4/2007 |
| CN | 1949220 | 4/2007 |
| CN | 1949732 | 4/2007 |
| CN | 1968100 | 5/2007 |
| WO | WO2079984 | 10/2002 |
| WO | WO2005062572 | 7/2005 |
| WO | WO2006020758 | 2/2006 |

OTHER PUBLICATIONS

Exponential Time Decay Rank—Google Search, printed Nov. 18, 2011, 2 pgs.

Extended European search report for European Application No. 07785371.1, dated Mar. 18, 2011, 9 pgs.

Heer et al. "Vizster:Visualizing Online Social Networks,"University of California, Berkely, dated Oct. 23, 2005, 8 pages.

PCT International Search Report and Written Opinion, PCT/CN2007/002486, dated May 22, 2008, 6 pages.

PCT International Search Report and Written Opinion, PCT/CN2007/002487, dated May 29, 2008,5 pages.

Singh et al. "CINEMA: Columbia InterNet Extensible Multimedia Architecture." Department of Computer Science, Columbia University, dated May 2002, 83 pages.

Yahoo!Groups (screenshots from Internet Wayback Machine of Yahoo!Groups, dated Jan.-Feb. 2005, <http://help.yahoo.comlhelp/us/groups/groups-23.html, 3 pages.

Adamic et al., "A Social Network Caught in the Web," Internet Journal, First Monday, Jun. 2, 2003, pp. 1-22, vol. 8, No. 6.

Anwar et al., "Leveraging 'Social-Network' Infrastructure to Improve Peer-to Peer Overlay Performance: Results from Orkut," University of Illinois at Urbana-Champaign USA, 2005, 9 pgs.

AT &T Personal Reach Service: Benefits and Features, Mar. 29, 2010, 7 pgs.

AT&T Personal Reach Service: Personal Reach Service, Mar. 29, 2010,2 pgs.

Baird et al., "Neomillennial User Experience Design Strategies: Utilizing Social Networking Media to Support "Always on" Learning Styles," J. Educational Technology Systems, vol. 34(1),2005-2006, Baywood Publishing Co., Inc., pp. 5-32.

Boyd, et al., "Social Network Sites: Definition, History, and Scholarship," Journal of Computer-Mediated Communication, International Communication Association, 2008, pp. 210-230.

Churchill et al., "Social Networks and Social Networking," IEEE Computer Society, Sep.-Oct. 2005, pp. 14-19.

Cohen et al., "Social Networks for Creative Collaboration," C&C '05, Apr. 12-15, 2005, pp. 252-255, London, United Kingdom.

Decker et al., "The Social Semantic Desktop," Digital Enterprise Research Institute, DERI Galway, Ireland, DERI Innsbruck, Austria, DERI Technical Report, May 2, 2004, 7 pgs.

Dukes-Schlossberg et al., "Battlefield Awareness and Data Dissemination Intelligent Information Dissemination Server," Air Force Research Laboratory, Rome Research Site, Rome, NY, Nov. 1, 1999,31 pgs.

Eagle et al., "Social Serendipity: Proximity Sensing and Cueing," MIT Media Laboratory Technical Note 580, May 2004, 18 pgs.

Erickson et al., "Social Translucence: Using Minimalist Visualizations of Social Activity to Support Collective Interaction," Designing Information Spaces: The Social Navigation Approach, Springerverlag: London, 2003, pp. 1-19.

Gross et al., "Information Revelation and Privacy in Online Social Networks," WPES '05, Alexandria, Virginia, Nov. 7, 2005, pp. 71-80.

Hammond et al., "Social Bookmarking Tools (I)," D-Lib Magazine, Apr. 2005, vol. II, No. 4, ISSN 1082-9873,23 pgs.

International Search Report, International Application No. PCT/CN2007/002488, dated Feb. 14, 2008, 6 pgs.

International Search Report, International Application No. PCT/US2008/005118, dated Sep. 30, 2008, 2 pgs.

Leonard. "You Are Who You Know." Internet. retrieved at http://www.salon.com. Jun. 15, 2004, 15 pgs.

(56) References Cited

OTHER PUBLICATIONS

LiveJournal, "FAQ #163: How Do I Find a Syndicated Account?" Last Updated: thebubba, Jan. 6, 2004, 2 pgs.

Marwick, "Selling Your Self: Online Identity in the Age of a Commodified Internet," University of Washington, 2005, 192 pgs.

MediaSift Ltd., DataSift: Realtime Social Data Mining Platform, Curate and Data Mine the Real Time Web with DataSift, Dedipower, Managed Hosting, [Retrieved on May 13, 2011], 1 pg.

Metcalf et al., "Spatial Dynamics of Social Network Evolution," 23rd International Conference of the System Dynamics Society, Jul. 19, 2005, pp. 1-13.

Mori et al., "Real-world Oriented Information Sharing Using Social Networks," Group '05, Sanibel Island, Florida, USA, Nov. 6-9, 2005, pp. 81-84.

Omurchu et al., "Online Social and Business Networking Communities," Digital Enterprise Research Institute DERI Technical Report, National University of Ireland, Aug. 11, 2004, 22 pgs.

Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.

Neumann et al., "Semantic social network portal for collaborative online communities," Journal of European Industrial Training, 2005, Emerald Group Publishing, Limited, vol. 29, No. 6, pp. 472-487.

Ring Central, Inc., Internet, retrieved at http://www.ringcentral.com. Apr. 19, 2007, 1 pg.

Steen et al.. "Development of we-centric. context-aware, adaptive mobile services requires empathy and dialogue," Freeband FRUX, Oct. 17, 2005, Internet Journal, Netherlands, pp. 1-4.

Superfeedr Track, Internet, retrieved at http://blog.superfeedr.com/trackl filter/xmpp/pubsubhubbub/track, May 13, 2011, 8 pgs.

Twitter Blog: Tracking Twitter, Internet, retrieved at http://blog.twitter.com/2007/09/tracking-twitter.htrnl, May 13, 2011, 2 pgs.

Twitter Announces Fire Hose Marketplace: Up to 10K Keyword Filters for 30 Cents, Internet, retrieved at http://www.readywriteweb. com/archives/twitter_announces_fire_hose_marketplace_up_ to_l0kphp, May 13, 2011, 7 pgs.

Van Eijk et al., "We-centric, context-aware, adaptive mobile service bundles," Freeband, Telematica Instituut, TNO telecom, Nov. 30, 2004, 48 pgs.

Wenger et al., "Technology for Communities," CEFRIO Book Chapter v 5.2, Jan. 18, 2005, pp. 1-15.

Breslin, et al., "Towards semantically-interlinked online communities." The Semantic Web: Research and Applications (2005): 71-83.

Exponential Time Decay Rank—Google Search, printed Nov. 18, 2011, 2 pages.

Rank Topic Forum—Google Search, printed Nov. 7, 2011, 2 pages.

Agarwal et al.., "Enabling Real-Time User Interests for Next Generation Activity-Oriented Social Networks," Thesis submitted to the Indian Institute of Technology Delhi, Department of Computer Science & Engineering, 2005, 70 pgs.

Baidu's Post Bar, Internet (no English translation available), retrieved at http://web.archive.org/web.archive.orglweb/20100105195837!http:tieba.baidu.comi, Jan. 5, 2010, 1 pg and Baidu's Post Bar, Internet (English translation of current website), retrieved at http://www.post.baidu.com. May 11, 2012, 4 pgs.

\* cited by examiner

RANKING SOCIAL NETWORK OBJECTS

CROSS REFERENCE TO RELATED APPLICATIONS

This application is a continuation of and claims priority to U.S. application Ser. No. 14/049,561, filed Oct. 9, 2013, titled "Ranking Social Network Objects," which is a continuation of and claims priority to U.S. application Ser. No. 12/673,764, filed Feb. 16, 2010, titled "Ranking Social Network Objects," which is the National Stage of International Application No. PCT/CN2007/002488 filed Aug. 17, 2007, titled "Ranking Social Network Objects," each of which are incorporated by reference herein in their entirety.

FIELD OF THE INVENTION

The invention generally relates to social networks. More particularly, the invention relates to ranking objects such as communities, forums, members, postings, and photographs in social networks.

BACKGROUND OF THE INVENTION

Online social networks connect users with common interests to each other. Social networking sites such as Myspace.com, Friendster.com, Tribe.net, and Orkut.com foster relationships between their members, thereby offering a higher level of affiliation and trust than other online media through which users can interact with each other such as electronic message boards or forums.

These and other social networks have witnessed tremendous growth by offering users unique opportunities for self-expression, socialization, and the distribution of user-made content. The proliferation of social network objects such as users, communities, postings, and other forms of content, however, has exacerbated the challenge of identifying relevant and high quality content. Existing search interfaces within social networks leave much to be desired. While results may be returned based on word matches or user ratings, for instance, other ways to assess the importance or quality of objects found is generally lacking. As a result, a user may be required to view many low-quality and unwanted items before finding a social network object of interest. Conventional methods of ranking webpages also have their shortcomings when applied to social networks. They generally rely solely on measures of value extrinsic to an online social network such as the location and frequency of keywords on a particular page. These metrics, however, do not by themselves reflect the value of an object in a social network.

SUMMARY OF INVENTION

Social network objects of various object types can be ranked, each according to its type. The objects may comprise types such as users, communities, blogs, blog entries, events, forums, forum topics, postings, photographs, images, and/or albums. According to one method, ranking data about the social network objects are stored. The ranking data comprises data about events performed on the social network. For each social network object, a ranking function is applied to ranking data about the social network object based on its type. In addition, the recency of an event on the social network related to the social network object is evaluated, in order to calculate the score for the social network object. A relative ranking for each of the plurality of social network objects based on its score is determined, and the score and relative ranking of each of the social network objects stored.

In an embodiment, a query for social network object is received. The generated search result comprises social network objects of different object types. Code for, when executed, displaying the search result ordered by the relative rankings of the social network objects is generated. Alternatively, social network objects with a score above a predetermined threshold are identified. Code for, when executed, displaying the identified social network objects in a visually distinguishable way on a webpage of the social network is generated.

The figures depict embodiments of the invention for purposes of illustration only. One skilled in the art will readily recognize from the following description that alternative embodiments of the structures and methods illustrated herein may be employed without departing from the principles of the invention described herein.

DETAILED DESCRIPTION

Overview

The present disclosure describes various methods and systems for the creation of communities in online social networks and distribution of content within them. Techniques and systems for ranking objects such as users, forum topics, albums, blogs, and communities within social networks are also disclosed. The techniques described herein can be applied to various online social networks including public and private online networks, social networks within enterprises, and social networks within other environments.

The features and advantages described herein are not all-inclusive and, in particular, many additional features and advantages will be apparent to one of ordinary skill in the art in view of the figures and description. It should also be noted that the language used in the specification has been principally selected for readability and instructional purposes, and not to limit the scope of the inventive subject matter. Furthermore, the description herein focuses on selected features of online social networks including communities, forums, and ranking systems. Other techniques, functionalities, and components not discussed, whether conventional or custom, can be used as desired in conjunction with providing these features, as will be apparent in light of this disclosure.

System Architecture

Figure 1:
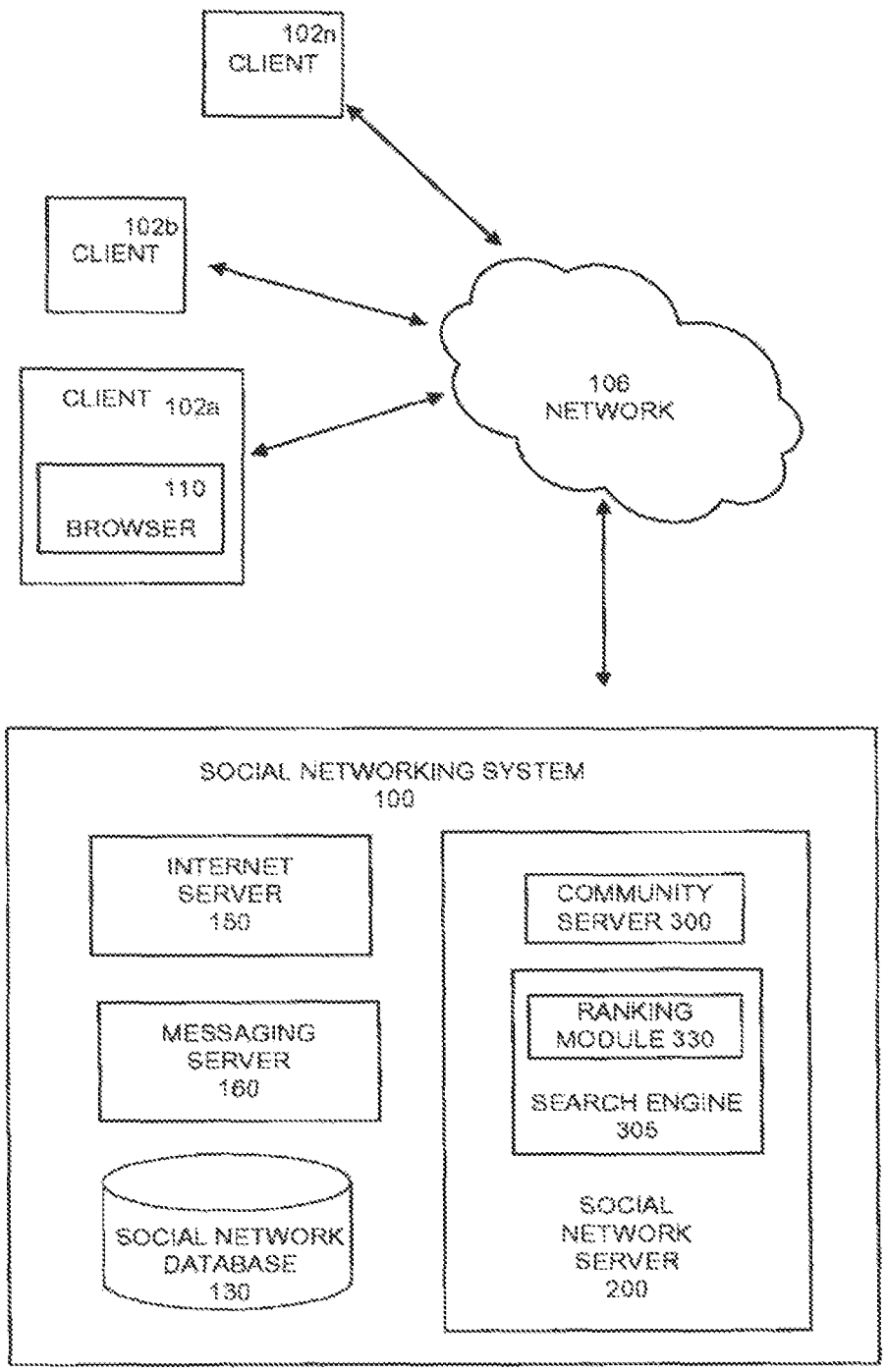
FIG. 1 is a block diagram of an online social networking system in accordance with one embodiment of the present invention.

FIG. 1 is a block diagram of an online social networking system in accordance with one embodiment of the present invention. The social networking system 100 communicates with multiple client devices 102 over a network 106. Each of the client devices 102 includes a browser 110 or comparable application for providing and accessing content managed by the social networking system 100. (In FIG. 1 and the remaining figures, a letter after a reference numeral, such as "102a," is a reference specifically to the element having that particular reference numeral. A reference numeral in the text without a following letter, such as "102," is a general reference to any or all instances of the element bearing that reference numeral; e.g. "102" refers to reference numerals "102a," "102b," and/or "102n" in the figures.) The social networking system 100 includes a social network server 200 and an internet server 150. The social network server 200 includes a community server 300 and ranking module 330, and is coupled to a social network database 130. These elements are used by the social network server 200 to provide social network services and content to clients 102 and facilitate social networking interactions between them.

The social network server 200 enables users of devices such as clients 102, to interact with other users in an online social network. The various servers in the social networking system 100 may comprise a dedicated server-class computer system comprising applications, one or more processors, memory, storage, and associated software applications. The servers may also individually comprise multiple computers operating under a load balancing scheme, or other mechanisms for distributing processes and data.

The social networking system 100 supports an online social network comprising a set of entities who are members of the social network, and who communicate with each other via the services and facilities of the system 100. A member of an online social network can be any entity such as, for example, a person, an organization, a business, a corporation, a community, or other suitable entity. These entities can have various types of social relationships, such as community membership, professional or social organizations, friendships, or simply groups with common interests.

Each member is represented by a stored profile that comprises one or more entries containing information about the member. A member may be represented by a person profile, business profile, organizational profile, or a profile belonging to any other class of profile. Each member has an identifier that can be used to identify the member within the network (e.g., a user name). Each profile type is associated with different types of entries. For instance, a person profile can include entries comprising contact, personal, and professional information, while a business profile may include entries describing industry information or financial information. Other entry types can store social, demographic, networking, or other types of information. Personal profile entries may comprise contact information such as email addresses, mailing addresses, IM name, or phone number, personal information such as relationship status, birth date, age, children, ethnicity, religion, political view, sense of humor, sexual orientation, fashion preferences, smoking habits, drinking habits, pets, hometown location, passions, sports, activities, favorite books, music, TV, or movie preferences, or favorite cuisines, professional information such as skills, career, or job description; photographs of a person or other graphics associated with an entity, or any other information describing, identifying, or otherwise associated with a profile. Entries for a business profile can comprise industry information such as market sector, customer base, location, or supplier information, financial information such as net profits, net worth, number of employees, stock performance, or other types of information associated with the business profile.

Each member's profile includes information that associates the member with the profiles of other members in the social network. An association between members has a type. Types of associations include, for example, friendships, romantic relationships, business relationships, acquaintances, community associations, activity partner associations, common interest associations, common characteristic associations, or any other suitable type of association between profiles. For example, a user may designate himself as a "fan" or a "friend" of another user. A given type of association can have multiple levels to indicate the degree of the association. For example friendship levels can include, for example, a "haven't met" level, an "acquaintance" level, a "friend" level, a "good friend" level, a "best friend" level, or other suitable levels. Similar levels for other types of associations are readily determined by those of skill in the art.

The social network system 100 further supports the creation and manipulation of a variety of social network objects. The social network objects include the members themselves (as represented by their user name), as well and the various types of content objects supported by the social network, including forums and message posting therein, blogs, community, albums, images, media files, articles, documents, and the like. Users of clients 102 can enter search queries (e.g., via a browser) to search for any of these objects in the social network system 100. The search queries are provided over the network 106 to the social network server 200 and processed by a search engine 305. The search engine 305 comprises code for parsing search queries, a crawler for locating social network objects, and a ranking module 330 for ranking and indexing social network objects. The search engine receives search queries and can perform Boolean or relevance searching based on the queries. The results are ordered in accordance with the indexing performed by the ranking module, and provided to the community server 300. The community server 300, in turn, takes the search results and provides them in a format that the requesting client 102 can use to present the data to the user (e.g., via a browser or other application). If no matches are found, alternative search queries may be provided to users, as is discussed in greater detail with respect to FIG. 3.

The ranking module 330 evaluates and ranks various online social network objects returned in response to a query and is described in greater detail with reference to FIG. 3. As users take actions within a social network, such as registering in a network, designating another member as a friend or fan, joining a community within the network, viewing webpages, annotating profiles, and posting content, these events are indexed. The indexed information includes the type of object being created, manipulated, or accessed, the type of event, and the associated details, such as a timestamp, user, and so forth. This event data can then be used as the basis of object rankings. The ranking module 330 accesses this ranking data and processes it to determine scores and rankings for social network objects. The particular ranking function applied to each object and the ranking data to which the ranking function is applied depends on the object's type. The ranking functions can be based on either direct, derived, or aggregated values. The ranking functions preferably rank objects as an indicator of their popularity, as computed by various metrics, as further described below. For instance, a member can be ranked according to the number of his or her fans and friends, while a community forum can be evaluated based on the number and recency of posts in the forum, the number of members, the rate at which posts are being made or the rate of member sign up, and so forth. Various ranking functions are described in greater detail with reference to FIG. 4. On a periodic basis, the rankings are refreshed and saved into an index. As described with reference to FIG. 4, the indexed ranking data is used to order search results, select objects for presentation, and/or designate certain social network objects as popular.

The social network server 200 also comprises a community server 300 for carrying out various aspects of online community management such as creating and operating communities. Communities are named and preferably have descriptions that specify the types of topics, events, and members of the community. Communities may also have keywords and/or labels that indicate the types of topics and subject categories that are off interest to the members of the community, and which can be used to classify the community and its members. Posting within a community may be moderated by a member or online community provider comprising a community "owner" or may be unmoderated. Community membership may be restricted in some manner or may be open to the public at large.

Communities may be placed into various categories and subcategories of organization. Community subcategories can comprise groups of profiles within a larger category that share common interests or characteristics independent from the entire community. For example, a general "basketball players" community category can comprise communities of basketball players for any location or type of basketball. A sub-community category within the basketball community category could comprise communities of basketball players belonging to a certain geography. Thus, a "California basketball players" sub community category could comprise communities including "LA basketball player," "Oakland basketball player," and "Santa Clara basketball player" communities. The general "basketball community" can also be placed into a larger overall "basketball" community that includes "basketball player" communities as well as "basketball watcher" communities.

The community server 300 supports the management of variety of community features and social objects therein, such as forums, events, messaging, blogs, photo albums, maps, links to news and web pages, relevant advertisements, and affinity and other links to other members or communities, as described in greater detail with reference to FIG. 2. The community server 300 comprises code for distributing content within community forums, blogs, event calendars, and other community medium. The community server also stores information about policies for individual communities including, membership, posting, content distribution, privacy, posting of photos and other content, management of subtopics, and other policies.

Community content, links, images, postings, relationships, descriptions, and other community data as well as member data and profiles are stored by community server 300 within the social network database 130. The database 130 may be implemented as one or more relational database management system (RDBMS), lightweight database access protocol (LDAP), flat file, and/or other databases, or using another database architecture. Data storage elements may include any one or combination of methods for storing data, including without limitation, arrays, hash tables, lists, and trees. Other similar types of data storage devices can be accessed by the server 200. The community server 300 receives data comprising the profiles and communities from the social network database 130 and also sends data comprising communities and profiles to the social network database 130 for storage. The social network database 130 is communicatively coupled to the social network server 200 by way of a network connection (not shown).

The social network server 200 is coupled to an internet server 150 and a messaging server 160. The internet server 150 comprises a server for serving content to requesting clients. Through its connection to the internet server 150, the social network server 200 can provide internet content to online social networks and communities, through links to relevant web pages, news, advertisements, and pages discussed within community forums. In an embodiment, the internet server 150 or social network server 200 is coupled to a messaging server 160 for providing instant messaging, email, or other messaging services. The messaging server 160 also or alternatively comprises a mobile device messaging server that is in communication with a cellular phone or other mobile communications network. The social network server 200 can communicate and exchange messages on behalf of social network members using the server 160.

The client devices 102 shown in FIG. 1 each comprise a processor 110, memory, network interface, display device, a computer-readable storage, and input devices, as well as optional peripheral devices. The processor executes computer-executable program instructions stored in the memory to access the functionality of the social network server 200. Examples of client devices 102 are personal computers, digital assistants, personal digital assistants, cellular phones, mobile phones, smart phones, pagers, digital tablets, laptop computers, Internet appliances, and other processor-based devices. In general, a client device 102 may be any type of processor-based device that is connected to a network 106 that comprises a browser 110 or similar hosted application program. Client devices 102 may operate on any operating system capable of supporting a browser-enabled application or browser, such as Microsoft®, Windows®, or Linux. The client devices 102 include a browser 110 or similar application program for accessing the social networking system 100. The social network server 200 generates and serves community webpages. It provides HTML (hypertext markup language), images, scripting language (e.g., JavaScript, JScript, Visual Basic Script), XSLT (extensible style sheet language transformation), and other static elements that are used by a browser 110 on a client device 102.

The network 106 enables data communication between and among the entities shown in FIG. 1. The network 106 will typically include some combination of local area networks (LAN) or wide area networks (WAN) in communication with the Internet, using standard communications technologies and/or protocols. Portions of any of these networks can be wired or wireless, using the associated technologies (e.g., Ethernet, 802.11 802.16, integrated services digital network (ISDN), digital subscriber line (DSL)), and protocols (e.g., TCP/IP, HTTP, SMTP, and FTP). The data exchanged over the network 106 can be represented using technologies and/or formats including the hypertext markup language (HTML), the extensible markup language (XML), the simple object access protocol (SOAP) and/or other formats. In addition, all or some of links can be encrypted using conventional encryption technologies such as the secure sockets layer (SSL), Internet Protocol security (IPsec), Secure HTTP and/or virtual private networks (VPNs). In another embodiment, the entities can use custom and/or dedicated data communications technologies instead of, or in addition to, the ones described above.

It should be noted that embodiments of the present invention may comprise systems having different architectures than that which are shown in FIG. 1. The system 100 shown in FIG. 1 is merely exemplary, and is used to help explain the social network elements and methods illustrated in FIGS. 2-6.

Illustrations of an Online Community

Figure 2:
FIG. 2 depicts a webpage of an online community of a social network in accordance with one embodiment of the present invention.

FIG. 2 depicts an example of webpage of an online community of a social network, as provided by the social networking system 100. A wide variety of services and features are provided for members of the online community "Beijing 2008 Olympics." A description of the community, "A community for travelers to and fans of the Beijing Olympics" is provided on the page, as well as an image 250 that represents the community. The name, description, and image of the community 205 can be provided by the community creator or author of the community, or may be supplied by a community content module as described below. The community server 300 of FIG. 1 supports the various services described and/or shown. As shown, the status of certain members is depicted as online and offline, depending on whether or not the members are logged in to the community or the online social network that the community belongs to.

The community webpage includes a search interface 210 for receiving queries from members seeking content on the online social network. This content can comprise various social network objects such as members, discussion forums 220, events, photo albums, blogs, documents, files, and communities. Such objects can be ranked in accordance with any of a variety of ranking popularity functions, including those described with reference to FIG. 4. Objects with high popularity rankings may be annotated, for instance with a star, or placed into a particular portion of a community webpage such as a "hot pick" or "most popular" section.

The community webpage includes several forums 220 for discussion of various topics, such as "volunteer opportunities," and "fencing fans sought." The forums include messages in a discussion thread. Messages can be modified and deleted after their creation by the creator or by an administrator of the community. In an embodiment, messages on the same topic can be browsed from the oldest to the most recent. In addition, a topic can contain an unlimited number of messages. Users can create topics for discussions. In an embodiment, the topic comprises the subject of a first message in a discussion thread. Topics can be modified and deleted after their creation by the creator or by an administrator of the community. Several most recent topics are displayed on the community pages. Communities may allow for "open" posting by members outside of the community. Or they may restrict posts to community members, as specified by the community creator or administrator.

The community webpage also includes an event calendar 230 for storing information about events. Events are short messages describing an event (location, date, etc). In an embodiment, any user can create, modify, and delete their own events as well as post community events. Several most recent events may be displayed on the event calendar 230. The event calendar can be supplemented with geographic information including the location of the event. In an embodiment, a map display of an event location is included in or linked to from the community page. Users can choose to participate in events, and participants in an event may be made visible to other members of the community.

A number of different types of links may be supported in an online social network among users and communities. As shown in FIG. 2, a community can be linked to one or more related communities 240. This helps users find communities of interest. In an embodiment, such related communities are automatically identified by checking what communities have the most members in common, relative to their size. Communities can also be considered "related" if there is a significant degree of overlap between forum topics, titles, keywords, or other community aspects.

A community may have self-regulatory mechanisms. For instance, a member may be able to "report spam" using a report spam button. In addition, a community may have outlinks to relevant content on the internet. Such links may comprise web links, news links, and links to relevant advertisements. The content may be customized based on user activity on the community webpage, for instance within forum, event, or other types of activity. A community may also support messaging by its members. A community member may, for instance, send and receive text, instant, or email messages.

Social Network Server Elements

Figure 3:
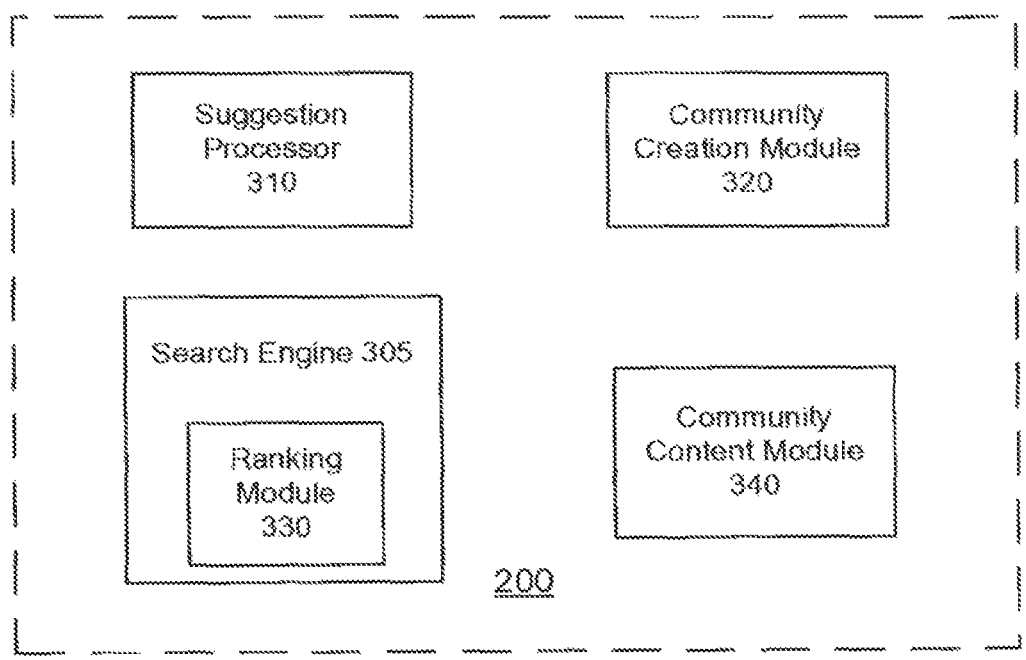
FIG. 3 is a high-level block diagram of elements on a social network server.

FIG. 3 is a high-level block diagram of selected elements on a social network server in accordance with one embodiment of the present invention. The elements comprise a search engine 305, suggestion processor 310, community creation module 320, ranking module 330, and community content module 340. As used herein, the term "module" refers to logic for providing the specified functionality. A module can be implemented in hardware, firmware, and/or software. Preferably, a module is stored on the storage component of an electronic device, loaded into its memory, and executed by the device processor. The community creation module 320 and community suggestion processor 310 facilitate the creation of communities within an online social network. The community content module 340 routes and distributes content within an online social network. The search engine 305 receives and processes search requests and generates search results that include objects on the social network as well as on the Internet generally. It includes the ranking module 330, which evaluates and ranks various objects within a social network.

The community creation module 320 comprises a module for creating online communities. The community creation module 320 enables the dynamic creation of online communities according to specific scenarios. In one scenario, a member types in a search query in order to locate a community of her interests, using for instance a search interface within an online social network. The search engine 305 processes the search query and looks for matches, for instance an exact match to the search query and/or matches to one or more of the search terms. When there are no matches, according to whatever search approach is used by the search engine 305, the community creation module 320 prompts the user to create a new public community with a name supplied by the user. The name is unique among public communities.

In another scenario, the community creation module 320 dynamically creates a public named community when a user attempts to specify a community that does not exist. In such a scenario, a user attempts to apply a label to a social network object such as an event, posting, forum, or blog entry. The search engine searches for any communities that have names that match one or more terms in the label name. If there are no communities that match the label name, the community creation module 320 dynamically creates a community with the label name. Under both of these scenarios, a community is automatically created for the user, bypassing the conventional community creation process.

In an embodiment, the resulting community under either of these scenarios is a public community whose ownership belongs to the public. This means that the community is administered by social network administrators rather than the creator or her designees. Once a community has been created, the community creation module 320 may prompt the user to optionally enter some description, labels, and/or keywords and provide images for the community. The community creation module 320 preferably performs additional steps to automate the population and management of newly created communities. For instance, the community creation module 320 may apply default settings to the community that membership is open to the public, rather than restricted. The new community includes the user as a member.

In addition, the community creation module 320 may implement several controls or policies on the new community that encourages members to join the community by reducing the risk of spam and off-content posting. Such controls may include disallowing the sending of messages to all community members, and disabling anonymous posting by social network users. These controls may be publicized in a community information or profile page. They may be encoded by a social network server into the presentation of community webpages (e.g. with or without a "send to all members" option displayed). Furthermore, a community rules engine may implement controls such that, when a user attempts a prohibited action, they are prevented from doing so. The community creation module 320 may also automatically search for relevant web content such as news, images, and advertising posted on the internet and place such content in a newly created forum or an existing forum. Similar searches for related or relevant communities, members, blogs, and other online social network content can be performed. The searches may be performed based on the community name, or any other content description, keyword, images, or content provided by the user. This information may be used in combination with the user's profile information such as the user's membership in related communities, friends, or fans. For instance, communities that have overlapping keywords with a newly created community may be identified as appropriate for receiving a solicitation to join the new community. A social network server generates code that, when executed, displays a link to the new community to these identified pre-existing communities. Other users within the online social network to whom the new community can be advertised may be identified in a similar way. Users are identified that have provided keywords, labels, postings, or other content to the social network that match the new community's name, keyword, or other description using standard Boolean, relevance, or other matching techniques. Links to the new online community can also be provided to these users.

A suggestion processor 310 may be provided to improve the community creation process carried out by the community creation module 320. The suggestion processor 310 comprises a server and software for providing search results to unmatched search queries using any of a variety of techniques. For instance, in an embodiment, the suggestion processor 310 uses known language processing techniques to identify spelling, grammatical, or other obvious errors in a user query. The suggestion processor 310 devises one or more suggested search terms, based on a dictionary, a directory of existing community names, or the most common spelling of each word in the query, based on queries of other users. The terms may be supplied back to the user, who can be prompted to re-initiate a search based on the revised terms. In another embodiment, the suggestion processor 310 may use other language processing techniques that rely, for instance, on known associations/substitutions of words (as may be provided by a thesaurus or slang dictionary, for instance) to search existing communities and suggest them to a user based on their query. The search may be performed based on the names as well as keywords of existing communities. For example, a user may enter a query like "China Olympic," "or" Peking 2008." Although there may not be a specific match for either of these community names, the suggestion processor 310, based on information about existing communities or the most common spellings of words based on queries of other users, may suggest the community "Beijing Olympics 2008" to the user. By providing such suggestions, the risk of creating of multiple communities with different names that all are meant to refer to the same thing is minimized.

The community content module 340 comprises code for distributing content within a social network. Users provide content to the online social network such as forums, forum posts, events, blog entries, documents, files, videos, and images. The community content module 340 takes the content and makes it available to other users. In an embodiment, the content module 340 supports multi-community content sharing. When a user creates an object such as a forum within the context of a single community, the user may indicate by direct designation what other communities the forum topic should also be cross-posted to. In an embodiment, the user does not need to directly designate communities for cross-listing of the object contributed by the user. Instead, the user can associate labels with the object. Based on the label, a matching module (not shown) can find relevant communities to which to also cross-post the user's contribution. The community content module 340 receives this information and uses it to provide the object to multiple different communities. Responses to the object, such as follow up posts, entries, or comments provided by other users may also be provided by the community content module 340 within the different communities in which the object is posted. Alternatively, the responses may also be provided in a single webpage accessible to the multiple communities devised by the community content module 340. The ranking module 330 comprises a processor for ranking various social network objects such as users, communities, forums, blogs, blog postings, and photo albums. The ranking module 330 collects data with which the social network objects can be scored and ranked. Object rank can be generated based on extrinsic factors, such as the popularity of the object to users as measured, for example, based on quantity, velocity, or recency of access or responses received, or other intrinsic factors such as the status of the poster of the object. Ranking data such as community traffic may be stored in a social network database. The engine 330 periodically evaluates objects within the social network using the ranking data in order to determine a score or rank for each of the objects.

Ranking Social Network Objects

Figure 4:
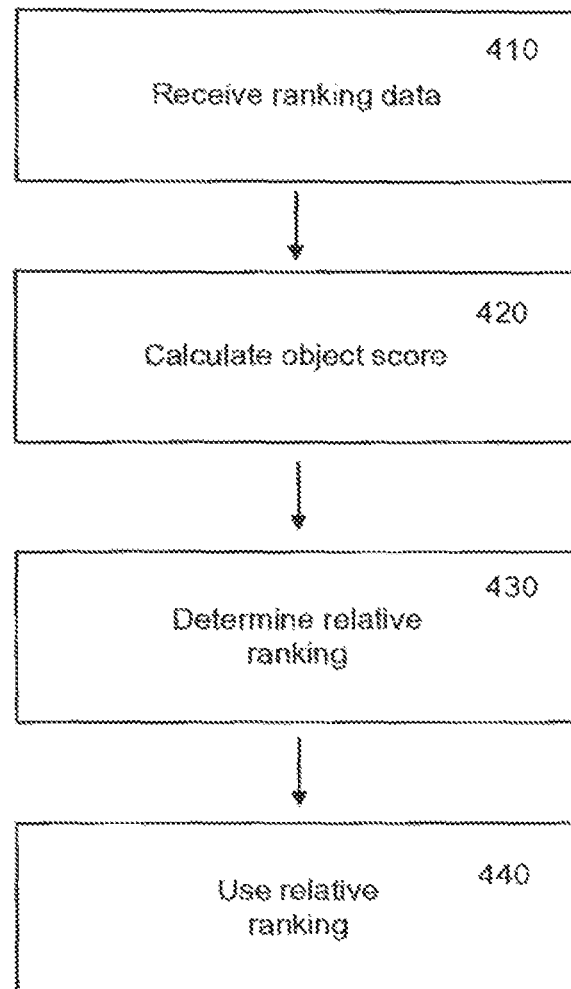
FIG. 4 is a flow chart illustrating a process for scoring social network objects.

FIG. 4 is a flow chart illustrating a process for ranking social network objects in accordance with an embodiment of the present invention. The ranking process may be applied to the various types of social network objects (users, communities, forum topics, etc.) on a regular basis, as ranking data is refreshed, or triggered by an external event, for example. The resulting rankings reflect the importance of a social network object, as measured according to a variety of metrics specific to social networks.

As illustrated in FIG. 4, a ranking module collects or receives 410 ranking data about social network objects to be ranked, for instance, stored in a social network database. The ranking data comprises information about events on a social network, such as member visits to web pages, social network postings, replies in a forum, user registrations, changes to a user profile, changes to membership in a community, or other indicia of activity within an online social network. Each type of collected ranking data corresponds to at least one type of social network object. For instance, as described in more detail below, ranking data for a forum topic comprises data about posts on the topic, while ranking data for communities in the social network comprises data about members in the communities, and ranking data about users comprises data about registration times of the users on the network. Also as described below, specific ranking functions particular to each object type are applied to the ranking data.

The ranking data also comprises externally generated ratings of social network objects such as the page rank of social network web pages based on hyperlinks to the web pages. Methods for calculating a page rank are described in U.S. Pat. No. 6,285,999, titled "Method for Node Ranking in a Linked Database" and/or U.S. Pat. No. 6,799,176, titled "Method for Scoring Documents in a Linked Database" and/or U.S. Patent Application No. 20050071741, titled "Information Retrieval Based on Historical Data," each of which are hereby incorporated by reference herein. Page rank or other external ranking data may be retrieved from an internet or other server external or coupled to a social network server as shown in FIG. 1. The retrieved ranking data is then stored.

The ranking module applies one or more ranking functions to the ranking data to calculate 420 a score for a social network object. In an embodiment, the rank of each type of object is calculated based on its type. Different factors are used in the ranking function depending on the object type, as shown below.

| Object Type | Factors |
| --- | --- |
| Forum Topic (post) | the time of the post being published |
|  | the number of replies |
|  | the time of each reply |
|  | the number of views |
|  | topic ratings |
|  | the time of each view |
|  | the owner of the post |
|  | the community of the post owner |
| User | the registration time |
|  | the number of friends |
|  | the number of fans |
|  | user ratings |
|  | the number of profile views |
|  | whether the user has a photo |
|  | the total page rank of the user's posts or forum topics |
| Community | the number of members |
|  | the total page rank of all member webpages |
|  | community page views |
|  | page rank of community web pages |
|  | the total page rank of all posts |
| Blog Entry | the number of views |
|  | the number of replies |
|  | page rank of the entry |

These factors are not exhaustive and can be extended. In addition, under certain ranking schemes or ranking functions, individual factors may be weighted more than once. For instance, in an embodiment, the total page rank of all members in a community overlaps with the total page rank of all posts in the community since the page rank of the posts are taken into account when each member's page rank is calculated.

The factors for a given type of social network object are evaluated by a corresponding ranking function to calculate 420 a score for a given social network object. For example, one or more factors may be determined and weighted, then the contributions summed in a linear combination. In addition, the value of an individual factor, such as the number of members, may be determined by taking into account the recency or time of the events related to the factor. Doing so allows more recent events to "count" more than less recent events.

To take the recency of an event into account, one of a variety of functions can be used. In an embodiment, an exponential time decay function is applied to each event to determine the value of a factor. The function takes the form of:

$$y = f(\Delta t) = e^{-\Delta t}$$

where,
$\Delta t$ is the time distance from the present time, and
y is the event factor.

When $\Delta t=0$, or the time is the present, the influence factor is 1. According to this function, the rating accorded to an event is subject to exponential decay with respect to time. In another embodiment, a time decay function can take the form of:

$$y = f(\Delta t) = \frac{1}{(\Delta t + 1)}.$$

Some exemplary ranking functions are provided below.
Forum Topic
A topic in a forum is ranked according to a ranking function:

$$\text{score} = \omega_1 \cdot \sum_{i=1}^{K_1} f(\Delta t_i) + (1 - \omega_1) \cdot \sum_{j=1}^{K_2} f(\Delta t_j)$$

where,
$K_1$ = the number of replies,
$K_2$ = the number of views,
$\Delta t$ is the time of a reply (or view) (assuming $\Delta t=0$ for the current time); and $\omega 1$ and $\omega 2$ are the weights, and indicate the relative importance of replies and views, respectively.

These values may be set automatically in a social network system to pre-fixed values or, adjusted by a system designer. Alternatively, a simpler ranking function based on the publication time of posts may be used:

$$\text{score} = \{\omega_1 \cdot K_1 + (1 - \omega_1) \cdot K_2\} \cdot f(\Delta t)$$

where $\Delta t$ is the average time of the post being published apart from the current time.
User Ranking
A user is ranked based on the results of post rankings, as well as the number of friends, fans, profile views of the given user:

$$\text{score} = \omega_1 \cdot \sum_{i=1}^{K_1} f(\Delta t_i) + \omega_2 \cdot \sum_{i=1}^{K_2} f(\Delta t_i) + \omega_3 \cdot \sum_{i=1}^{K_3} f(\Delta t_i) + \omega_4 \cdot \sum_{i=1}^{K_4} S_i$$

where,
$K_1$ is the number of other members whom the user has designated and/or which have designated the user a "friend" (i.e. reciprocal friend designation),
$K_2$ is the number of other members whom the user has designated and/or which have designated the user a "fan" (i.e., reciprocal fan designation),
$K_3$ is the number of profile views, $S_i$ is the pagerank of one post, and
$K_4$ is the number of posts owned by the user.
Or, the user may be scored based on the time of the user's registration:

$$\text{score} = \{\omega_1 \cdot K_1 + \omega_2 \cdot K_2 + \omega_3 \cdot K_3\} \cdot f(\Delta t) + \omega_4 \cdot \sum_{i=1}^{K_4} S_i,$$

In addition, another indicator of user importance is whether or not the user has a photo. The ranking score is positively scaled (e.g. 2×) for users with photos.

Community Ranking

A community is ranked according to its posts, for instance:

$$\text{score} = \sum_{i=1}^{K} S_i,$$

$S_i$ is the pagerank of each individual post in the community, and
$K$ is the total number of posts in the community.

In addition, a community is ranked according to its members, including their number, rankings, or other factors. The rank of the community is cumulative of user rankings, each of which can be weighted by how long the user has been a member of the community (i.e., length of time since the user joined the community). Other ranking functions, factors, and weightings are also used. "Boosts" increase the value of an event based on the recentness of the last posting or reply event within a forum, blog, or community for instance.

Additional scale factors can be used to further adjust the individual weightings. First, if an event has occurred within a predetermined time period from the present, its value is upscaled, i.e., multiplied by a value greater than one. Down scaling can be applied as well, if the number of events falls below a certain threshold. For example, if the number of replies in a forum is less than 5, then the weighted sum is multiplied by a value less than one. Recency may be accounted for using other techniques such as the total number of page views over a fixed time segment, etc.

Once scores have been calculated 420 for a group of objects, a relative ranking of the objects can be determined 430. The objects are sorted by scores, and the ranking of each object is its ordinal position in the sorted list. The rankings may then be used 440 in one of a variety of possible ways. For instance, the scores may be used 440 to rank objects relative to each other in the presentation of search query results. In addition, code for displaying objects with a score above a certain threshold may be generated that visually distinguishes or annotates the objects, using distinguishing fonts, colors, or graphics (e.g., a "star" icon) for instance, or be presented in the form of a "recommendation." The ranking can also be used 440 to determine what objects to place in a category such as "hot communities," "featured post," or on an electronic billboard. Objects that receive a top-ranking, that is, that are ranked above a certain rank, may be designated for inclusion in such categories. The top-ranked objects are thus designated as such to users.

One or more of the steps shown in FIG. 4 may be performed by elements on the client or server side. In addition, the steps and instructions of described could be embodied in software, firmware or hardware, and when embodied in software, could be downloaded to reside on and be operated from different platforms used by real time network operating systems. Not every possible step is shown in the figures. In addition, some embodiments perform different steps in addition to, or instead of, the ones described herein. Furthermore, the order of the steps can vary from that described herein. In other embodiments, some or all of the steps are performed by entities other than those described.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

The invention has been described in particular detail with respect to several possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of embodiments of the invention in terms of ranking functions and symbolic representations of operations on information. These ranking function descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Embodiments of the invention also include computer program products for performing various operations disclosed herein. The computer program products comprises program code that may be embodied on a computer-readable or accessible storage medium, such as, but not limited to, any type of disk including floppy disks, optical disks, CD-ROMs, magnetic-optical disks, read only memories (ROMs), random access memories (RAMs), EPROMs, EEPROMs, magnetic or optical cards, application specific integrated circuits (ASICs), or any type of media suitable for storing electronic instructions. One or more parts of the program code may be distributed as part of an appliance, downloaded, and/or otherwise provided to a customer.

The ranking functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

What is claimed is:

1. A computer-implemented method comprising:
    storing interest data about a plurality of social network objects, the interest data including an indication of respective social network objects in which users have an interest;
    receiving, using a computing device, a request to apply a label to a social network object;
    responsive to receiving the request to apply the label to the social networking object, generating, using the computing device, a query to locate a community having a first interest in a social network, the query specifying the first interest based on the label received in the request to apply the label to the social networking object;
    determining, using the computing device, that the community having the first interest based on the label received in the request to apply the label to the social network object does not exist; and
    responsive to determining that the community having the first interest based on the label received in the request to apply the label to the social network object does not exist, creating, using the computing device, the community having the first interest by storing social network objects that have interest data that corresponds to the first interest for the community in a database associated with the social network, the community having the first interest having a community name based on the label received in the request to apply the label to the social networking object.

2. The computer-implemented method of claim 1, further comprising:
    determining, using the computing device, a related group of communities in the social network from stored community data and a threshold level of common interest, the related group of communities including the community created with the community name;
    storing, using the computing device, the related group of communities; and
    providing, for display, the community with the related group of communities in the social network.

3. The computer-implemented method of claim 2, further comprising:
    determining, using the computing device, a subcategory of communities in the social network based on profiles with a common characteristic;
    storing, using the computing device, the subcategory of communities; and
    generating code, when executed, for displaying the community as a part of the subcategory of communities.

4. The computer-implemented method of claim 2, wherein common interests include keywords.

5. The computer-implemented method of claim 2, further comprising: determining, using the computing device, a number of common members between communities in the social network, and the related group of communities is based on the number of common members.

6. The computer-implemented method of claim 2, further comprising:
    storing, using the computing device, ranking data about communities, the ranking data comprising data about interests associated with each community; and
    determining, using the computing device, a score for each of the communities based on types of relationships in the community and interests associated with the communities.

7. A computer program product comprising a non-transitory computer-readable medium storing a computer-readable program, wherein the computer-readable program, when executed on a computer, causes the computer to perform operations comprising:
    storing interest data about a plurality of social network objects, the interest data including an indication of respective social network objects in which users have an interest;
    receiving a request to apply a label to a social network object;
    responsive to receiving the request to apply the label to the social networking object, generating a query to locate a community having a first interest in a social network, the query specifying the first interest based on the label received in the request to apply the label to the social networking object;
    determining that the community having the first interest based on the label received in the request to apply the label to the social network object does not exist; and
    responsive to determining that the community having the first interest based on the label received in the request to apply the label to the social network object does not exist, creating the community having the first interest by storing social network objects that have interest data that corresponds to the first interest for the community in a database associated with the social network, the community having the first interest having a community name.

8. The computer program product of claim 7, wherein the computer-readable program, when executed on a computer, further causes the computer to perform operations of:
    determining, using the one or more computing devices, a related group of communities in the social network from stored community data and a threshold level of common interests, the related group of communities including the community created with the community name;
    storing, using the one or more computing devices, the related group of communities; and
    providing, for display, the community with the related group of communities in the social network.

9. The computer program product of claim 8, wherein the computer-readable program, when executed on a computer, further causes the computer to perform operations of:
    determining, using the one or more computing devices, a subcategory of communities in the social network based on profiles with a common characteristic;
    storing, using the one or more computing devices, the subcategory of communities; and
    generating code, when executed, for displaying the community as a part of the subcategory of communities.

10. The computer program product of claim 8, wherein common interests include keywords.

11. The computer program product of claim 8, wherein the computer-readable program, when executed on a computer, further causes the computer to perform operations of: determining a number of common members between communities in the social network, and the related group of communities is based on the number of common members.

12. The computer program product of claim 8, wherein the computer-readable program, when executed on a computer, further causes the computer to perform operations of:
storing, using the one or more computing devices, ranking data about communities, the ranking data comprising data about interests associated with each community; and
determining, using the one or more computing devices, a score for each of the communities based on types of relationships in the community and interests associated with the communities.

13. A system comprising:
one or more processors;
one or more memories storing instructions that, when executed by the one or more processors, cause the system to perform operations including:
storing interest data about a plurality of social network objects, the interest data including an indication of respective social network objects in which users have an interest;
receiving, using a computing device, a request to apply a label to a social network object;
responsive to receiving the request to apply the label to the social networking object, generating a query to locate a community
having a first interest in a social network, the query specifying a first interest based on the label received in the request to apply the label to the social networking object;
determining that the community having the first interest based on the label received in the request to apply the label to the social network object is to be created; and
responsive to determining that the community having the first interest based on the label received in the request to apply the label to the social network object does not exist, creating the community and having the first interest by storing social network objects that have interest data that corresponds to the first interest for the community in a database associated with the social network, the community having the first interest having a community name.

14. The system of claim 13, wherein the instructions, when executed by the one or more processors, further cause the system to perform operations including:
determining, using the one or more computing devices, a related group of communities in the social network from stored community data and a threshold level of common interests, the related group of communities including the community created with the community name;
storing, using the one or more computing devices, the related group of communities; and
providing, for display, the community with the related group of communities in the social network.

15. The system of claim 14, wherein the instructions, when executed by the one or more processors, further cause the system to perform operations including:
determining, using the one or more computing devices, a subcategory of communities in the social network based on profiles with common a characteristic;
storing, using the one or more computing devices, the subcategory of communities; and
generating code, when executed, for displaying the community as a part of the subcategory of communities.

16. The system of claim 14, wherein co on interest include keywords.

17. The system of claim 14, wherein the instructions, when executed by the one or more processors, further cause the system to perform operations including determining a number of common members between communities in the social network, and the related group of communities is based on the number of common members.

18. The system of claim 14, wherein the instructions, when executed by the one or more processors, further cause the system to perform operations including:
storing, using the one or more computing devices, ranking data about communities, the ranking data comprising data about interests associated with each community; and
determining, using the one or more computing devices, a score for each of the communities based on types of relationships in the community and interests associated with the communities.

\* \* \* \* \*